US007055561B2

(12) United States Patent
Garcia et al.

(10) Patent No.: US 7,055,561 B2
(45) Date of Patent: Jun. 6, 2006

(54) PLANER APPARATUS

(75) Inventors: Jaime E. Garcia, Jackson, TN (US);
Waymon L. McNeal, Jr., Jackson, TN
(US); Vance E. Roe, Jackson, TN (US);
Jeffrey D. Weston, Jackson, TN (US)

(73) Assignee: Delta International Machinery Corp.,
Jackson, TN (US)

( * ) Notice: Subject to any disclaimer, the term of this
patent is extended or adjusted under 35
U.S.C. 154(b) by 0 days.

(21) Appl. No.: 11/148,992

(22) Filed: Jun. 9, 2005

(65) Prior Publication Data

US 2005/0224141 A1    Oct. 13, 2005

Related U.S. Application Data

(62) Division of application No. 09/918,168, filed on Jul. 30, 2001, now Pat. No. 6,951,231.

(51) Int. Cl.
*B27C 1/00* (2006.01)
*B27G 21/00* (2006.01)

(52) U.S. Cl. ................ 144/117.1; 144/252.1; 409/137

(58) Field of Classification Search ........... 144/114.1, 144/117.1, 252.1, 252.2; 83/100; 451/449, 451/456; 409/137; 408/67
See application file for complete search history.

(56) References Cited

U.S. PATENT DOCUMENTS

| 2,577,975 A | 12/1951 | Moore |
| 2,624,382 A | 1/1953 | Moore |
| 2,859,780 A | 11/1958 | Carlson |
| 2,873,776 A | 2/1959 | Buttke |
| 3,718,168 A | 2/1973 | Berends |
| 4,031,934 A | 6/1977 | Stadler |
| 4,335,768 A | 6/1982 | Bachmann |
| 4,360,048 A | 11/1982 | Schadlich et al. |
| 4,363,343 A | 12/1982 | Cuneo |
| 4,382,729 A | 5/1983 | Bachmann |
| 4,403,130 A | 9/1983 | Baker |
| 4,435,904 A | 3/1984 | Logan et al. |
| 4,436,126 A | 3/1984 | Lawson |
| 5,033,343 A | 7/1991 | Gerber |
| 5,143,128 A | 9/1992 | Chen |

(Continued)

OTHER PUBLICATIONS

Related pending U.S. Appl. No. 11/127,414, filed May 12, 2005.

(Continued)

*Primary Examiner*—Derris H. Banks
*Assistant Examiner*—Shelly Self
(74) *Attorney, Agent, or Firm*—Kirkpatrick & Lockhart Nicholson Graham LLP

(57) ABSTRACT

A planer having a base, a first support member attached to the base and supporting a cutterhead for selective travel in a first direction toward the base and a second opposite direction, a top frame attached to the first support member and a depth stop mechanism attached to the top frame for selectively preventing travel of the cutterhead in the first direction beyond a pre-selected distance from the base. A depth measuring device including a retractable tape may be attached to the cutterhead. A workpiece level indicator plate movable between an engaged position and a disengaged position may be attached to the planer to indicate contact with a workpiece. A locking mechanism for locking a pivotable infeed table of a planer in the upright position for storage, and thereby switching off power to the planer is also disclosed. The planer may include a readily attachable and detachable dust removal assembly.

11 Claims, 17 Drawing Sheets

U.S. PATENT DOCUMENTS

| | | |
|---|---|---|
| 5,430,952 A | 7/1995 | Betts |
| 5,459,647 A | 10/1995 | Betts |
| 5,671,789 A | 9/1997 | Stolzer et al. |
| D387,070 S | 12/1997 | Welsh |
| 5,725,035 A | 3/1998 | Shadeck |
| 5,771,949 A | 6/1998 | Welsh et al. |
| D397,122 S | 8/1998 | Welsh |
| 5,794,675 A | 8/1998 | Garcia |
| 5,795,113 A | 8/1998 | Wixley et al. |
| 5,815,934 A | 10/1998 | Eichberger et al. |
| 5,816,303 A | 10/1998 | Shadeck |
| 5,829,498 A | 11/1998 | Liao |
| 5,829,499 A | 11/1998 | Liao |
| 5,904,192 A | 5/1999 | Chen |
| D411,548 S | 6/1999 | Welsh |
| 5,927,357 A | 7/1999 | Welsh et al. |
| 5,957,173 A | 9/1999 | Garcia |
| 5,967,205 A | 10/1999 | Welsh et al. |
| 6,058,987 A | 5/2000 | Liao |
| 6,076,573 A | 6/2000 | Welsh et al. |
| 6,089,286 A | 7/2000 | Liao |
| 6,089,287 A | 7/2000 | Welsh et al. |
| 6,092,571 A | 7/2000 | Liao |
| 6,123,125 A | 9/2000 | Liao |
| 6,141,147 A | 10/2000 | Wixley et al. |
| 6,148,879 A | 11/2000 | Liao |
| 6,283,181 B1 | 9/2001 | Chiang |
| 6,289,956 B1* | 9/2001 | Shriver .................... 144/252.1 |
| 6,293,321 B1* | 9/2001 | Chiang .................... 144/117.1 |
| 6,315,014 B1 | 11/2001 | Chang |
| 6,443,676 B1 | 9/2002 | Kopras |
| 2001/0000856 A1 | 5/2001 | O'Bannion |

OTHER PUBLICATIONS

Related pending U.S. Appl. No. 11/148,656, filed Jun. 9, 2005.

US 5,495,785, 03/1996, Chen (withdrawn)

* cited by examiner

PLANER APPARATUS

The present application is a divisional application claiming priority under 35 U.S.C. § 120 from U.S. patent application Ser. No. 09/918,168, filed on Jul. 30, 2001, now U.S. Pat. No. 6,951,231

BACKGROUND OF THE INVENTION

1. Field of the Invention

The invention relates to a planer apparatus and, in particular, to a depth stop mechanism and other accessories for a planer.

2. Description of the Invention Background

Over the years, in response to consumer demand, thickness and finishing planers, i.e. planers for reducing the thickness of a piece of wood or similar materials while providing a smooth and flat finish, have been decreasing in size. Such portable planers balance the need to provide the required power to produce a smooth finish with the need to conserve space and decrease weight for portability.

The popularity of portable planers among professionals and woodworking enthusiasts has spurred the introduction of new features designed to increase versatility, precision and convenience. For example, U.S. patent application Ser. No. 09/782,453 to Garcia et al., assigned to the assignee of the present invention, discloses a portable planer having a compact two-speed gear mechanism that is actuated to drive the infeed and outfeed rollers of the planer selectively at a high or low speed.

U.S. Pat. No. 6,089,287 to Welsh et al. discloses a planer with a depth stop adjustment mechanism that allows an operator to select a minimum workpiece depth from one or more predetermined depths, but does not allow selection of any depth within the full range of travel of the cutterhead of the planer.

Also current depth stop arrangements are located between the cutterhead and the workpiece support table and can place undesirable torque on the cutterhead if the cutterhead is inadvertently lowered beyond the point wherein the depth stop engages the table or other support structure. Such torque can result in damage to the apparatus for positioning the cutterhead.

Additional accessories such as dust collector chutes, depth scales and workpiece level indicators need to be designed for ease of manufacturing, installation and cost-effectiveness.

There remains, therefore, a need for a planer that includes features that overcome the limitations, shortcomings and disadvantages of other planers without compromising their advantages.

SUMMARY OF THE INVENTION

The invention meets the identified needs, as well as other needs, as will be more fully understood following a review of this specification and drawings.

One embodiment of the invention includes a planer a base, a first and second support members attached to the base and supporting a cutterhead for selective travel toward and away from the base, a top frame attached to at least the first support member and a depth stop mechanism attached to the top frame for selectively preventing travel toward the base beyond a pre-selected distance from the base.

The depth stop mechanism may also include a depth stop member, such as a nut, rotatably supported on a portion of the first support member adjacent to an abutment surface thereof and slidably supported in the top frame. The depth stop mechanism may also include an adjustment assembly, such as a sleeve, in the top frame, for selectively adjusting a position of the depth stop member on the support member relative to the abutment surface.

Another embodiment of the invention includes a planer having a base, a top frame connected to the base, a cutterhead movably supported relative to the base to define an adjustable opening therebetween for selective travel in a first direction toward the base and a second opposite direction, and a depth stop mechanism attached to the top frame and not extending into the adjustable opening. The depth stop mechanism selectively prevents travel of the cutterhead in the first direction beyond a pre-selected distance from the base.

In another embodiment the planer may include a retractable measuring device, such as a tape, attached to the top frame of the planer. The retractable tape may have a first end retractably affixed to the top frame and a second end affixed to the cutterhead. The retractable measuring device has a scale thereon and may include a transparent member covering a portion of the scale, and a scale indicator. The scale indicator shows the height of the cutterhead from the base on the scale through the transparent member.

In another embodiment the planer includes a cutterhead, a motor operating the cutterhead, a power switch for the motor, and an infeed table pivotable between an operating position and an upright storage position that switches off the power to the motor. The planer includes a side frame with a first aperture thereon. The infeed table has a second aperture aligned with the first aperture so that the apertures may receive a locking device when the infeed table is in the storage position.

Another embodiment of the planer may also include a workpiece level indicator assembly mounted on the cutterhead. The workpiece level indicator assembly includes a workpiece level indicator plate that has a bottom face parallel to the base and a front ledge, and is movable between an engaged position and a disengaged position. When the cutterhead is lowered such that the bottom face of the indicator contacts the workpiece, the level indicator moves to the disengaged position. The workpiece level indicator assembly may also include a cover plate covering an inscription on the workpiece level indicator in the disengaged position and exposing the inscription in the engaged position.

The planer may also include a dust removal assembly that includes a manifold removably attachable to the cutterhead over the cutting member, a dust deflector directing airflow to the manifold, and a dust chute communicating with the manifold. The dust chute has a side opening for connection to a vacuum hose and has also a channel that is releasably connected to the carriage assembly through posts that are received in corresponding slots on the cutterhead.

One feature of an embodiment of the present invention is to provide a depth stop mechanism that is not located between the cutterhead and the workpiece support table.

It is a feature of at least one embodiment of the invention to provide a compact depth stop mechanism for a full range of travel of the cutterhead of a planer or other similar machine.

Another feature of the invention is to provide efficient, effective and easily installable accessories for a portable planer and other similar machines.

It is also feature of at least one embodiment of the invention to provide an inexpensive and readily adaptable depth measuring device and a convenient workpiece level indicator, either of which that can be used with or without a depth stop mechanism for a planer or other similar machine.

It is yet another feature of at least one embodiment of the invention to provide a locking mechanism for storing a portable planer in a safe position with the cutting member and power switch inaccessible to unauthorized persons.

It is also a feature of at least one embodiment of the invention to provide a dust removal assembly that is readily attached to and detached from a portable planer.

Other features and advantages of the invention will become apparent from the detailed description of the preferred embodiments and from the claims.

DETAILED DESCRIPTION OF THE INVENTION

Figure 1:
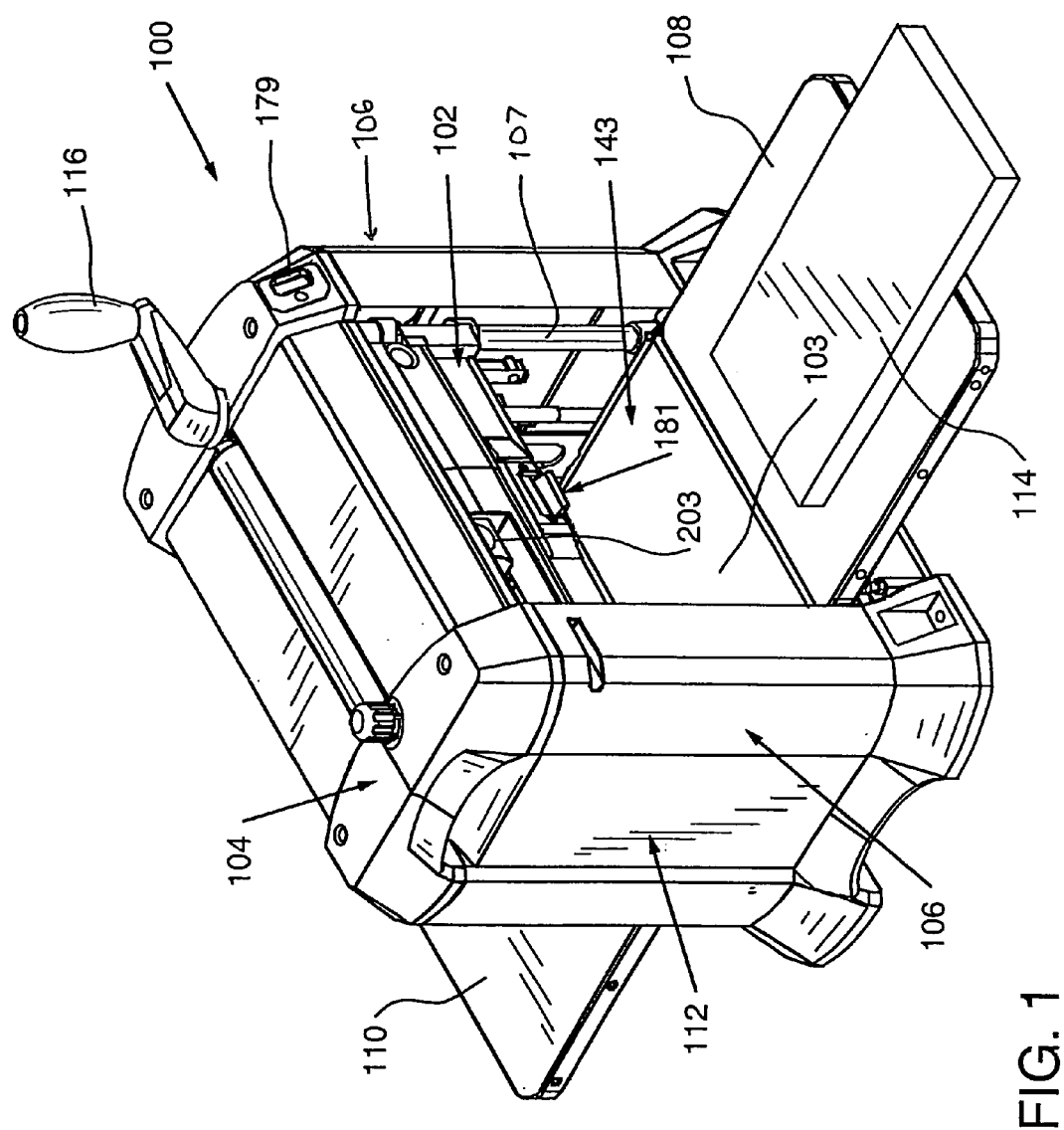
FIG. 1 is an isometric view of an embodiment of planer according to the invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity, even when such features may otherwise be necessary for the operation of a machine, such as a planer, embodying the invention. In addition, it will be appreciated that the characterizations of various components described herein as moving, for example, upwardly or downwardly, or being vertical or horizontal, are relative characterizations only based upon the particular position or orientation of a given component for a particular application.

FIG. 1 is an isometric view of a portable planer 100 according to one embodiment of the invention. The planer 100 includes a support structure, generally designated as 112, which includes a top frame 104, a base 103 for supporting a workpiece 114, columns 107 connecting the top frame 104 and the base 103, an infeed table 108 for supporting the workpiece 114 as it enters the planer 100, and an outfeed table 110 for supporting the workpiece 114 as it exits the planer 100. Side housings 106 cover portions of the planer 100.

Figure 2:
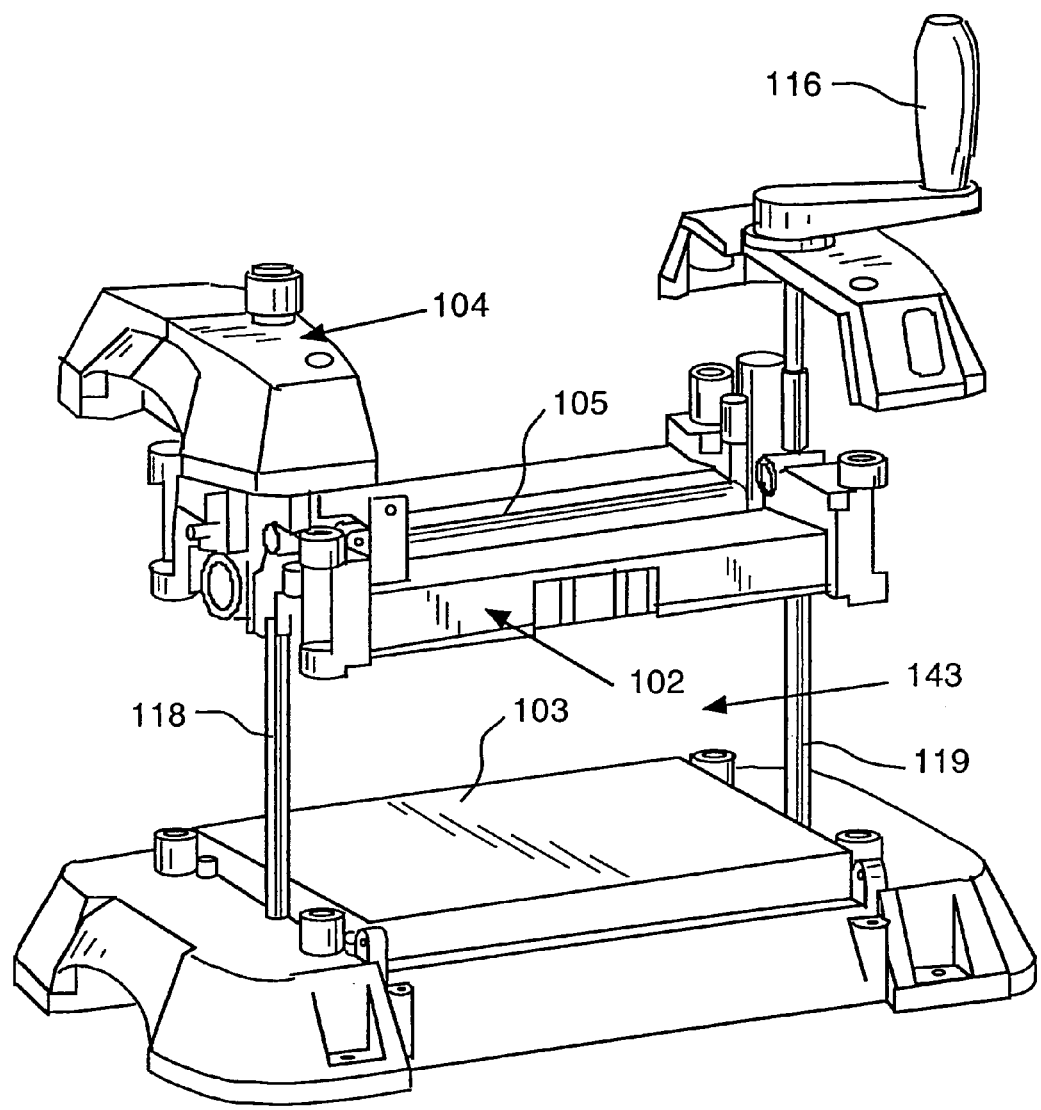
FIG. 2 is an isometric view of the planer of FIG. 1 with a portion of the support structure removed.
Figure 3:
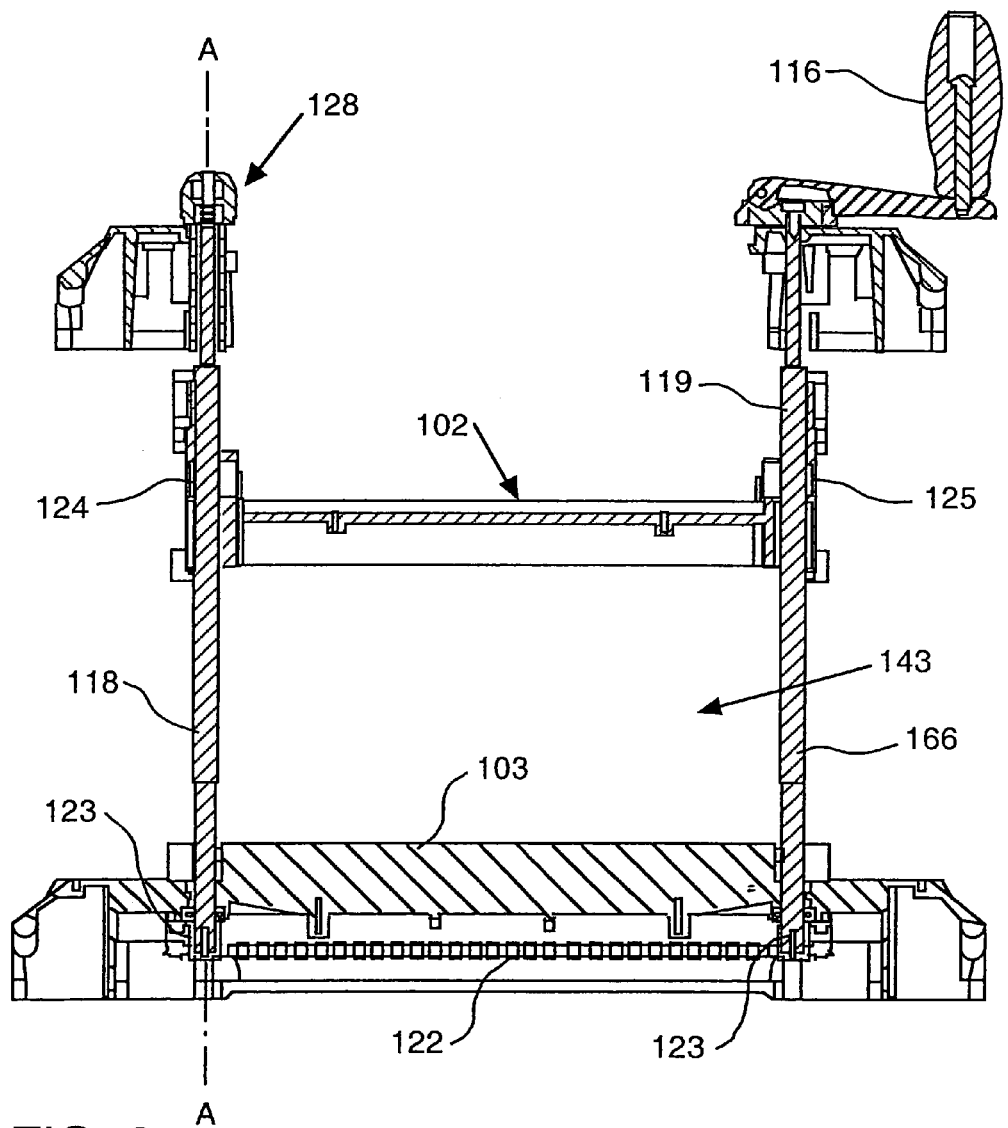
FIG. 3 is a sectional view of the planer of FIG. 1 with a part of the support structure for the planer removed to show an embodiment of the depth stop mechanism of the invention.

The planer 100 also includes a cutterhead or carriage assembly 102, as shown in FIGS. 2 and 3, in which part of the support structure 112 has been removed. The cutterhead 102 is mounted on a first support member also referred to as a spindle or elevating screw 118 and a second support member or spindle 119. The first spindle 118 defines an axis of rotation designated as A—A. The height of the cutterhead 102 from the base 103 can be adjusted by rotating a crank handle 116, which imparts rotational motion to the second spindle 119. An adjustable opening 143 is thereby defined between the cutterhead 102 and the base 103.

The first spindle 118 is linked to the second spindle 119 by a chain 122 and sprockets 123 or other means of transmitting rotational motion, so that the rotation of the second spindle 119 results in rotation of the first spindle 118. See FIG. 3. The first spindle 118 and the second spindle 119 may be engaged respectively with a first carriage nut 124 and second carriage nut 125, so that the cutterhead 102 may be moved up and down on the spindles 118 and 119 while remaining parallel to the base 103. The first carriage nut 124 and the second carriage nut 125 may be separate components inserted into the cutterhead 102 or they may comprise appropriate threaded surfaces that are integral to the cutterhead 102.

The typical travel distance of the cutterhead 102 relative to the base 103 of a portable planer 100, may be of the order of several inches. One planer, such as the model Delta 22-560 planer manufactured by Delta International Machinery Corp. of Jackson, Tenn., the assignee of this invention, for example, has a 6 inches travel.

In one embodiment, the planer includes an embodiment of a depth stop mechanism 128. See FIG. 4. The depth stop mechanism 128 permits an operator to select a minimum thickness dimension desired for a workpiece 114 and, by a simple operation, engage the depth stop mechanism 128 to stop the cutterhead 102 when the cutterhead 102 reaches a predetermined height from the base 103 corresponding to the desired minimum thickness dimension ($t_{min}$) for the workpiece 102. The predetermined height can essentially be any height along the travel path of the cutterhead 102 from the base 103 to the top frame 104.

Figure 4:
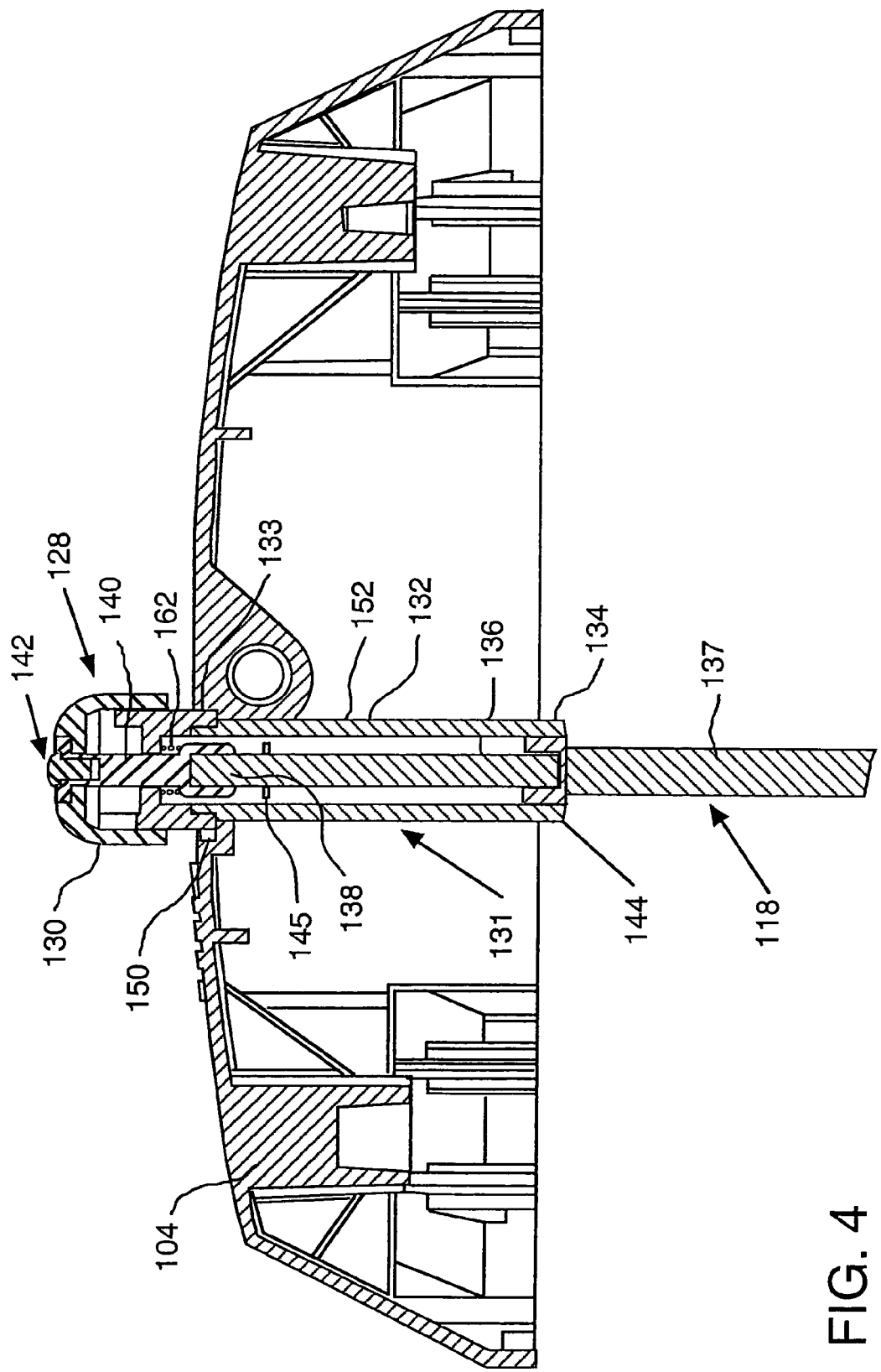
FIG. 4 is a sectional view of the depth stop mechanism of FIG. 3 in an engaged position.

As shown in FIG. 4, the depth stop mechanism 128 includes a knob 130 and an adjustment assembly generally designated as 131. In this embodiment, the adjustment assembly includes as sleeve 132 that has a top end 133 and a bottom end 134. The top end 133 may be an integral part of the sleeve 132 or it may be formed from a separate component such as a bushing attached to the sleeve 132. The sleeve 132 receives an upper portion 138 of the first spindle 118 and may slide along or rotate about the first spindle 118. A retainer shaft 140 within the sleeve 132 connects the upper portion 138 of the first spindle 118 to the knob 130 and is secured by a knob fastener 142, such as, for example, a retaining screw or retainer slot and ring. The first spindle 118 includes a first threaded portion 136 and a second threaded portion 137. The pitch $p_1$ of the first threaded portion 136 is smaller than the pitch $p_2$ of the second threaded portion 137, i.e. the number of threads per inch $n_1$ of the first threaded portion 136 is greater than the number of threads per inch $n_2$ of the second threaded portion 137, for reasons that will become apparent herein below.

The depth stop mechanism 128 of this embodiment further includes a depth stop member 144, such as a depth stop nut, which is threadedly engaged with the first threaded portion 136 of the first spindle 118, such that when the depth stop nut 144 rotates clockwise or counterclockwise with respect to the first spindle 118, the depth stop nut 144 moves down or up the first threaded portion 136 of the first spindle 118. The depth stop nut 144 may be, for example, a hex nut having a six-sided lateral surface. An abutment surface 146, also referred to herein as a spindle shoulder, may be formed at the junction of the first threaded portion 136 to the second threaded portion 137 by the difference of the diameters of the first threaded portion 136 to the second threaded portion 137 of the first spindle 118. See FIG. 5. Those of ordinary skill in the art will appreciate that when the depth stop nut 144 contacts the abutment surface 146, the depth stop nut 144 will be prevented from moving further downward on the first threaded portion 136. The abutment surface 146 may also be defined by an appropriate washer, nut or other similar means. Another washer 145 or abutment surface on the first threaded portion of the first spindle 118 prevents further upward motion of the nut 144 that may interfere with the function of the retainer shaft 140.

Figure 6:
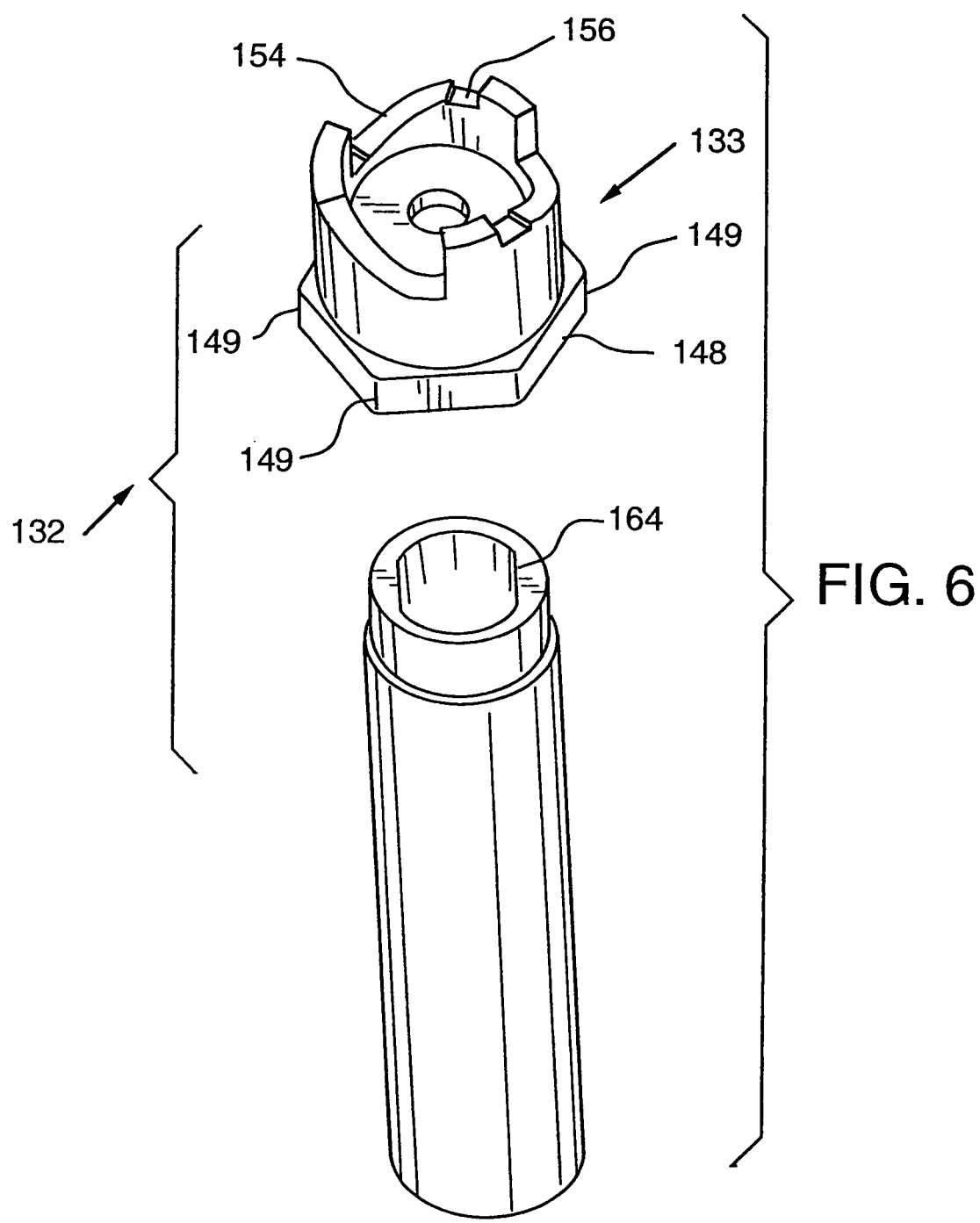
FIG. 6 is an exploded view of an embodiment of a sleeve of the depth stop mechanism of FIG. 3.
Figure 7:
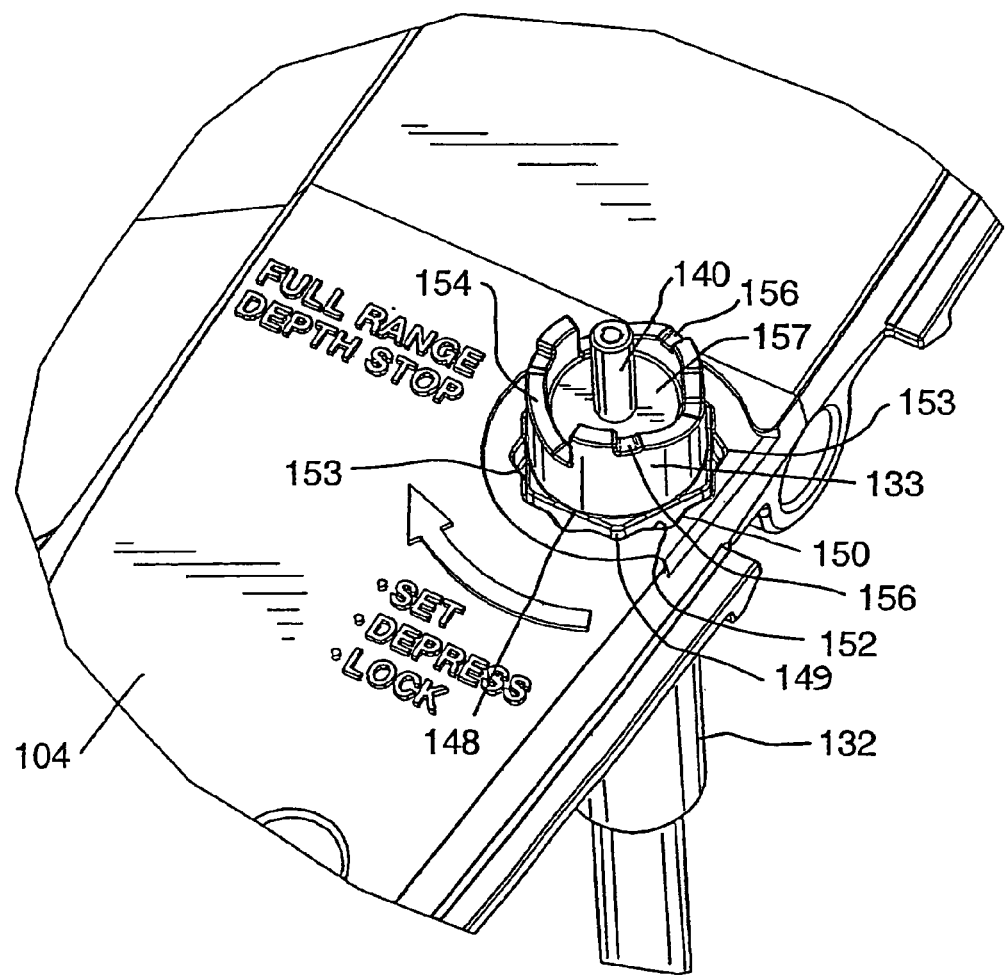
FIG. 7 is a partial isometric view of an embodiment of the top end of the sleeve of FIG. 6.

One embodiment of the sleeve 132 is shown in exploded view in FIG. 6. In this embodiment, the top end 133 of the sleeve 132 is partially received within a bore 152 in the top frame 104. See FIG. 7. In this embodiment, a portion of the exterior circumference of the top end 133 of the sleeve 132 is non-circular in shape and includes a hexagonally-shaped surface 148 that defines six corners 149. The exterior of the top end 133 is sized to be received in the bore 152. As can be seen in FIG. 7, the bore 152 has a surface 150 that defines a plurality of notches 153 for selectively receiving the corners 149 of the top end 133 therein. In the embodiment shown in FIG. 7, the bore 152 has a surface 150 with twenty four sides 150 and twenty four notches of which twelve outer notches 153 define twelve positions about axis A—A in which the sleeve may be retained. As will be further explained below, when the top end 133 is received within the bore 152 such that the corners 149 are received in corresponding notches 153, the top end 133 and ultimately the sleeve 132 is prevented from being rotatable about axis A—A.

Figure 8:
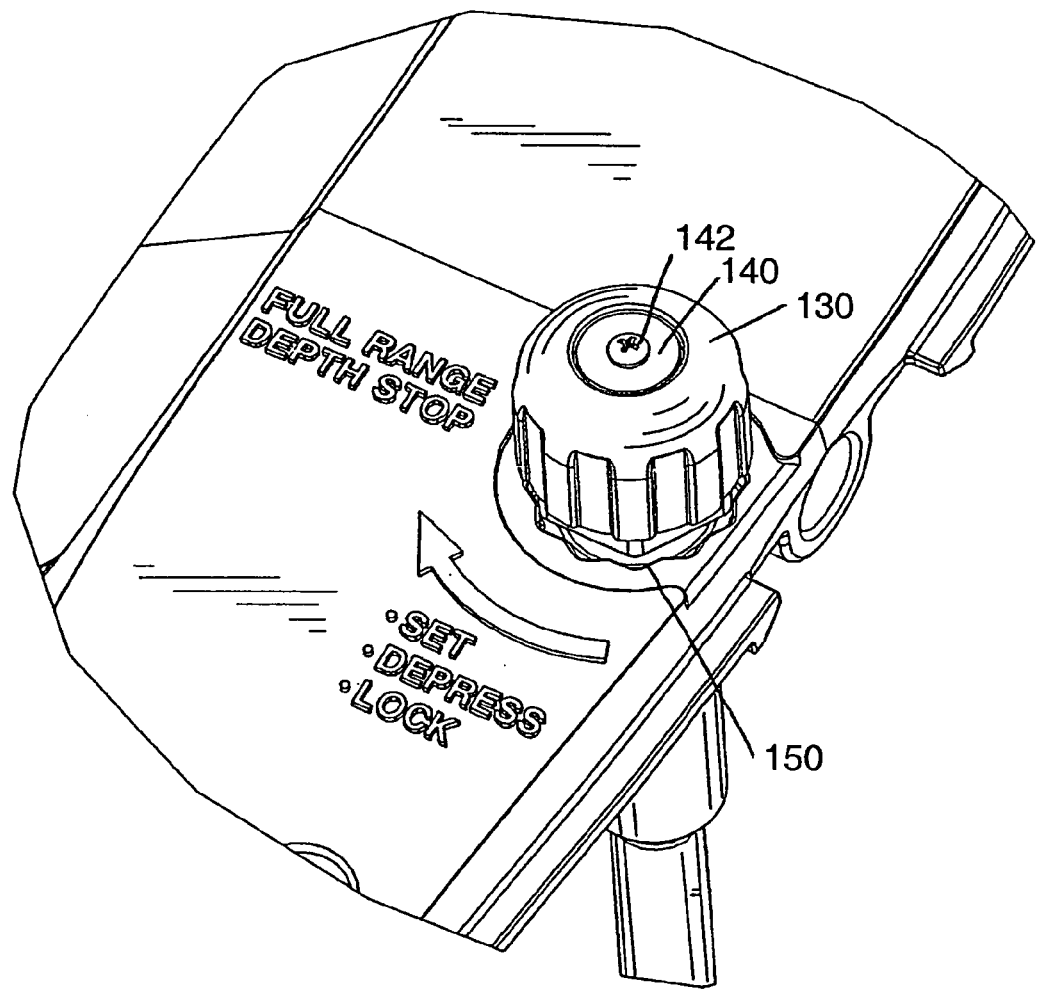
FIG. 8 is a partial isometric view of an embodiment of a knob attached to the sleeve of FIG. 6.
Figure 9:
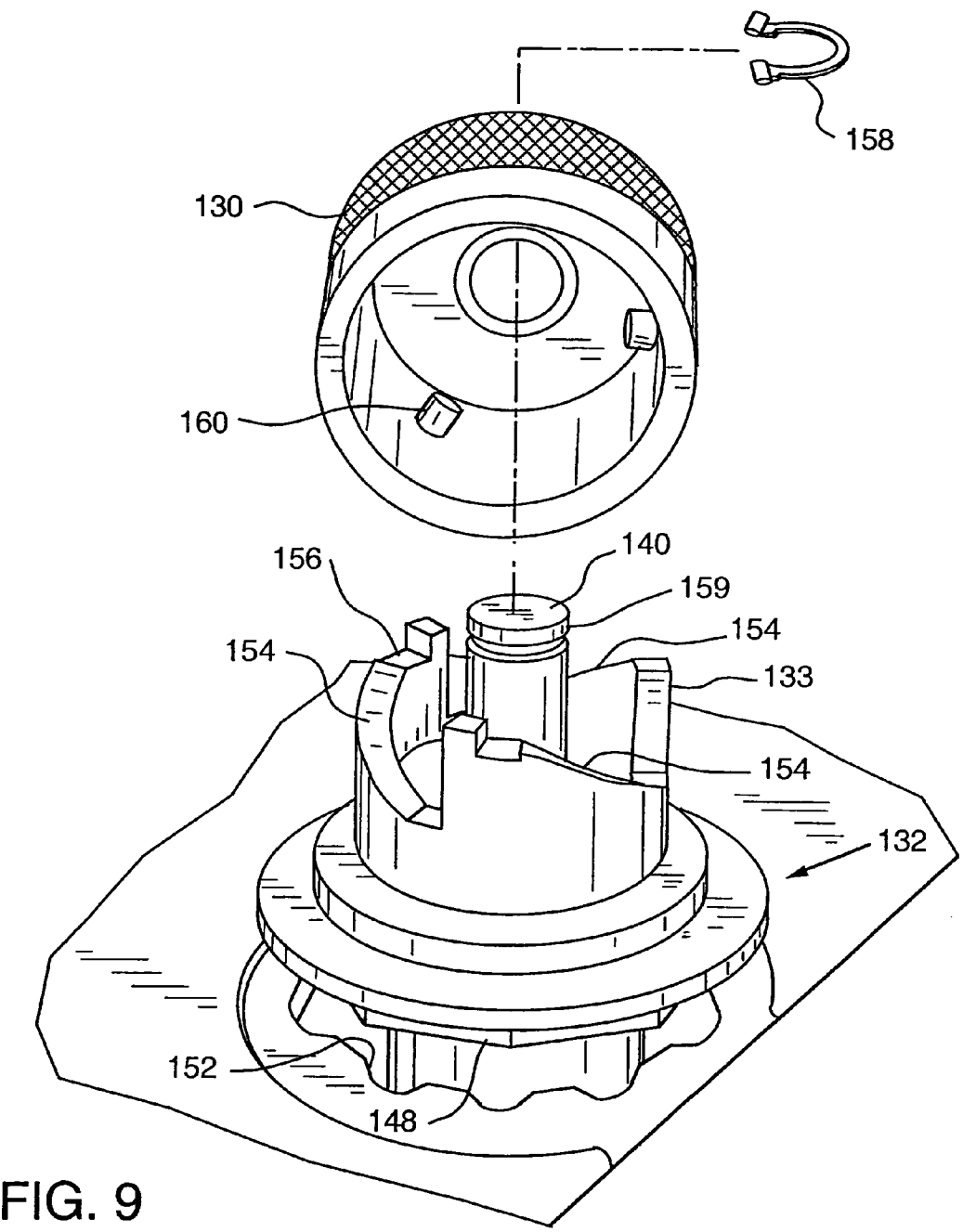
FIG. 9 is an exploded assembly view of an embodiment of the knob, retainer ring and retainer shaft for the depth stop mechanism of FIG. 3.

The top end 133 may further include a plurality of ramps 154 having corresponding slots 156, and an annular plate 157 for receiving the top end of the retainer shaft 140. The knob 130 is then fastened to the retainer shaft by a fastener 142, such as, for example, the retaining screw 142 shown in FIG. 8 or the retaining ring 158 and retaining slot 159 at the top of retainer shaft 140, as shown in FIG. 9.

In this embodiment, the knob 130 includes a plurality of posts 160 that correspond in number and are sized to fit into the slots 156 of the top end 133. In the embodiment shown in FIGS. 6, 7 and 9, there are three ramps 154, three slots 156 and three posts 160. A compression spring 162 is coiled around the retainer shaft 140 between the bottom surface of the annular plate 157 and a shoulder 163 in the retainer shaft 140, and is biased to push the sleeve 132 upwardly, i.e. toward the knob 130. See FIG. 5.

The inner surface of the sleeve 132 includes two diametrically opposed flat portions 164, which are sized to contact and hold respective sides of the depth stop nut 144, so that when the sleeve 132 rotates about the first spindle 118, the depth stop nut also rotates about the first spindle 118, causing it to move up or down the first threaded portion 136 of the first spindle 118.

Figure 5:
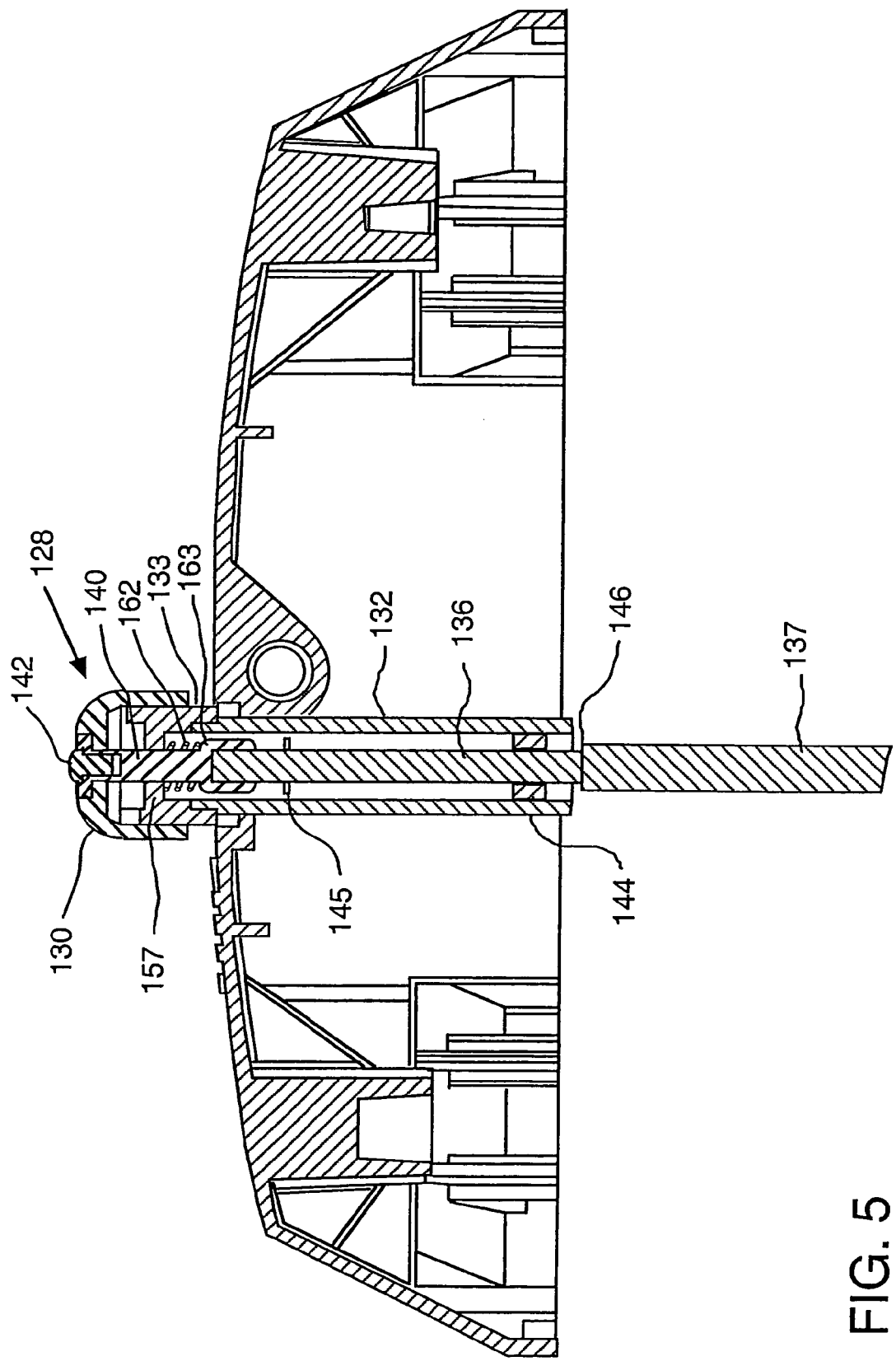
FIG. 5 is a sectional view of the depth stop mechanism of FIG. 3 in a disengaged position.

The depth stop mechanism 128 is selectively moveable between an engaged position, shown in FIG. 4, and a disengaged position, shown in FIG. 5. In the engaged position, the corners 149 of the top end 133 of the sleeve 132 are received within the corresponding notches 153 in the bore 152, which serves to prevent the sleeve 132 from either sliding or rotating about the first spindle 118. The sleeve 132 is retained in the engaged position by depressing and rotating the knob 130 so that the posts 160 ride up the ramps 154 and are received into the slots 156 thereby also compressing the spring 162. In this position, the depth stop nut 144 cannot rotate, but it will slidably move up or down within the sleeve 132 by the rotation of the first spindle 118.

In the "disengaged" position, illustrated in FIG. 5, the sleeve 132 may freely rotate and slide relative to the first spindle 118. The sleeve 132 can be rotated with the knob 130 in the unlocked position and the spring 160 extended. In this position, when the knob 130 is rotated, the sleeve 132 rotates, consequently rotating the depth stop nut 144 and causing it to move up or down on the first spindle 118.

As is often the case, a workpiece may have to be passed through the planer several times in order to attain the final desired thickness. Those of ordinary skill in the art will appreciate that after the workpiece 114 has passed through the planer 100, the cutterhead 102 is positioned closer to the base 103 and the workpiece 114 is again passed through the planer 100. This activity is repeated until the workpiece 114 is planed to a desired thickness. As will be discussed below, the depth stop mechanism 128 of the present invention permits the user to quickly and accurately establish a stop which prevents the cutterhead 102 from inadvertently being adjusted beyond a point which would result in the workpiece 114 being planed to a lesser than desired thickness.

This embodiment of the depth stop mechanism 128 operates as follows. The knob 130 is rotated counterclockwise to release it from the locked position causing the posts 160 to slide from the slots 156 down the ramps 154 with the spring 162 pushing the sleeve 132 up in the disengaged position and moving the hexagonal surface 148 out of the twenty-four sided surface 150 of the bore 152. Starting at the disengaged position, the cutterhead is moved to a desired height from the base 103 by operating the crank handle 116, which causes the second spindle 119 to rotate. The second spindle 119 has a threaded portion 166, which has the same pitch $p_2$ as the second threaded portion 137 of the first spindle 118. As the chain 122 and sprocket 123 transmit the rotational motion of the second spindle 119 to the first spindle 118, the common pitch $p_2$ keeps the cutterhead 102 level, i.e. parallel to the base 103.

After the cutterhead 102 has reached the height corresponding to the minimum thickness $t_{min}$ desired for the finished workpiece 114, the knob 130 is rotated clockwise, causing the sleeve 132, and therefore the depth stop nut 144, to also rotate clockwise. As a result, the depth stop nut 144 moves down the first threaded portion 136 of the spindle until it contacts the abutment surface 144. At this position, the knob 130 is depressed and rotated clockwise locking the sleeve 132 within the bore 152 thereby bringing the depth stop mechanism 128 in the engaged position. See FIG. 4.

Figure 10:
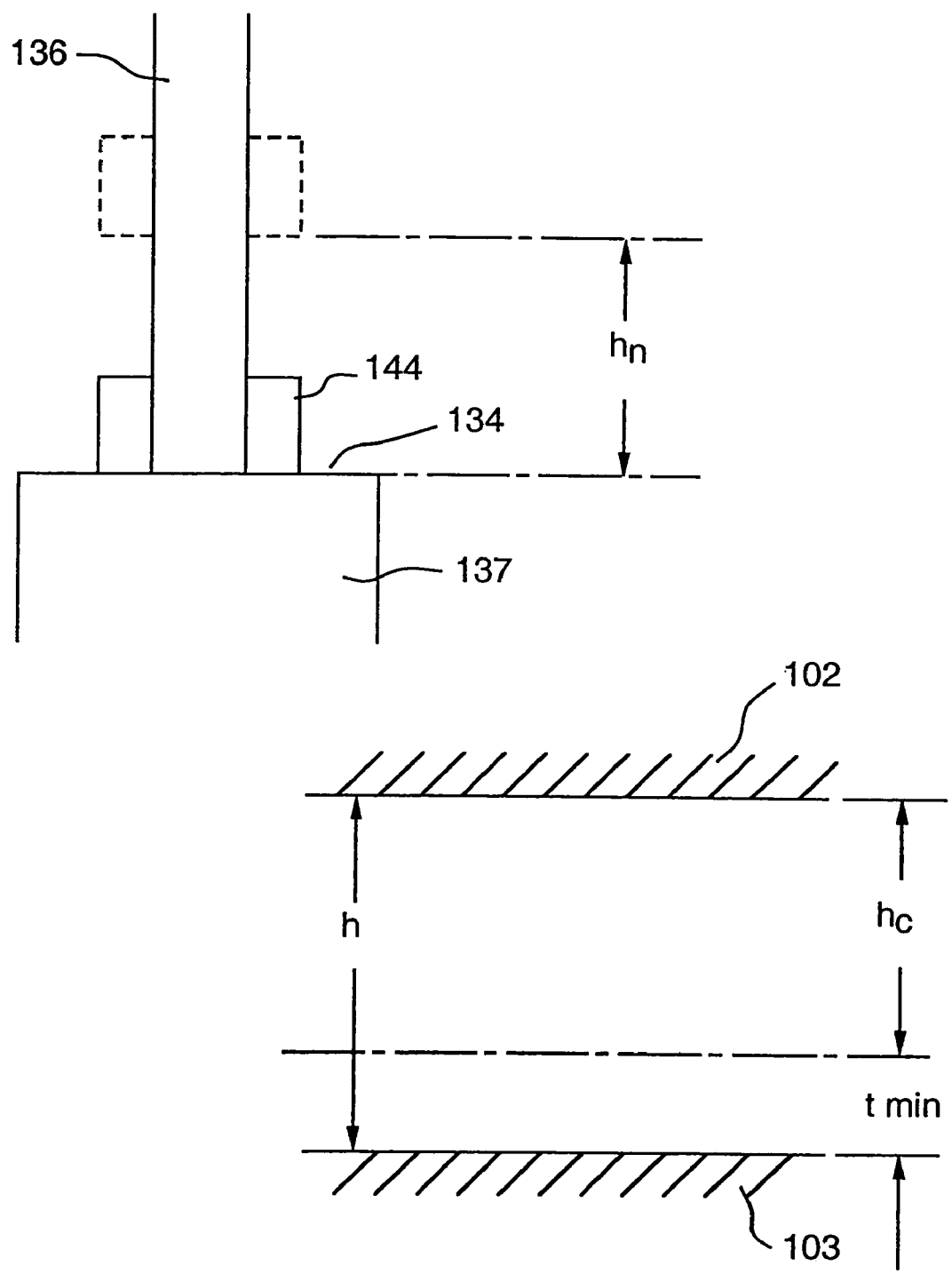
FIG. 10 is a diagram illustrating the height traveled by the depth stop nut for a corresponding height traveled by the cutterhead for the depth stop mechanism of FIG. 3.

The cutterhead 102 is thereafter moved away from the base 103 by operation of the crank handle 116 to an initial height "h" from the base 103 that will allow for an unfinished/thicker workpiece to be initially inserted. The height "h" is equal to $h_c$ plus $t_{min}$, where $h_c$ is the distance of the cutterhead 102 from the minimum desired distance $t_{min}$ from the base 103, as shown in FIG. 10. While the cutterhead 102 is raised to the initial height h, the rotation of the first spindle 118 causes the depth stop nut 144 to advance a distance $h_n$ away from the abutment surface 146. When the cutterhead 102 is gradually lowered to plane the workpiece 114 in successive passes, the depth stop nut 144 will also be advanced downward and eventually contact the abutment surface 146 having traveled a distance $h_n$ while the cutterhead 102 has traveled a distance $h_c$. The abutment surface 146 prevents the depth stop nut 144 from moving further downward and resists further rotation of the crank handle 116, and therefore prevents reduction of the thickness of the workpiece 114 beyond the predetermined minimum thickness $t_{min}$. By an appropriate choice of the pitch ratio $p_1/p_2$, the distance $h_n$ traveled by depth stop nut 144 is only a fraction of the distance $h_c$ traveled by the cutterhead 102:

$$(p_1/p_2)=(n_2/n_1)=(h_n/h_c).$$

For example, if the first threaded portion 136 has 40 threads per inch, or 1/40 pitch, and the second threaded portion 137 has 16 threads per inch or 1/16 pitch, then the depth stop nut 144 will travel only 40% (i.e. 16/40) of the distance traveled by the cutterhead 102. Accordingly, the cutterhead 103 can be set at any height from the base within its full range of motion, for example 6.5 inches, provided that the depth stop mechanism 128 is constructed such that the distance between the washer 145 and the abutment surface 146 is only 2.6 inches (40% of 6.5), with the pitch ratio chosen for this example. Therefore, the depth stop mechanism 128 is very compact and can be added as a feature of a portable planer 100 without increasing the overall dimensions of the planer, because the depth stop mechanism 128 can be accommodated within the original size of the planer 100.

Figure 11:
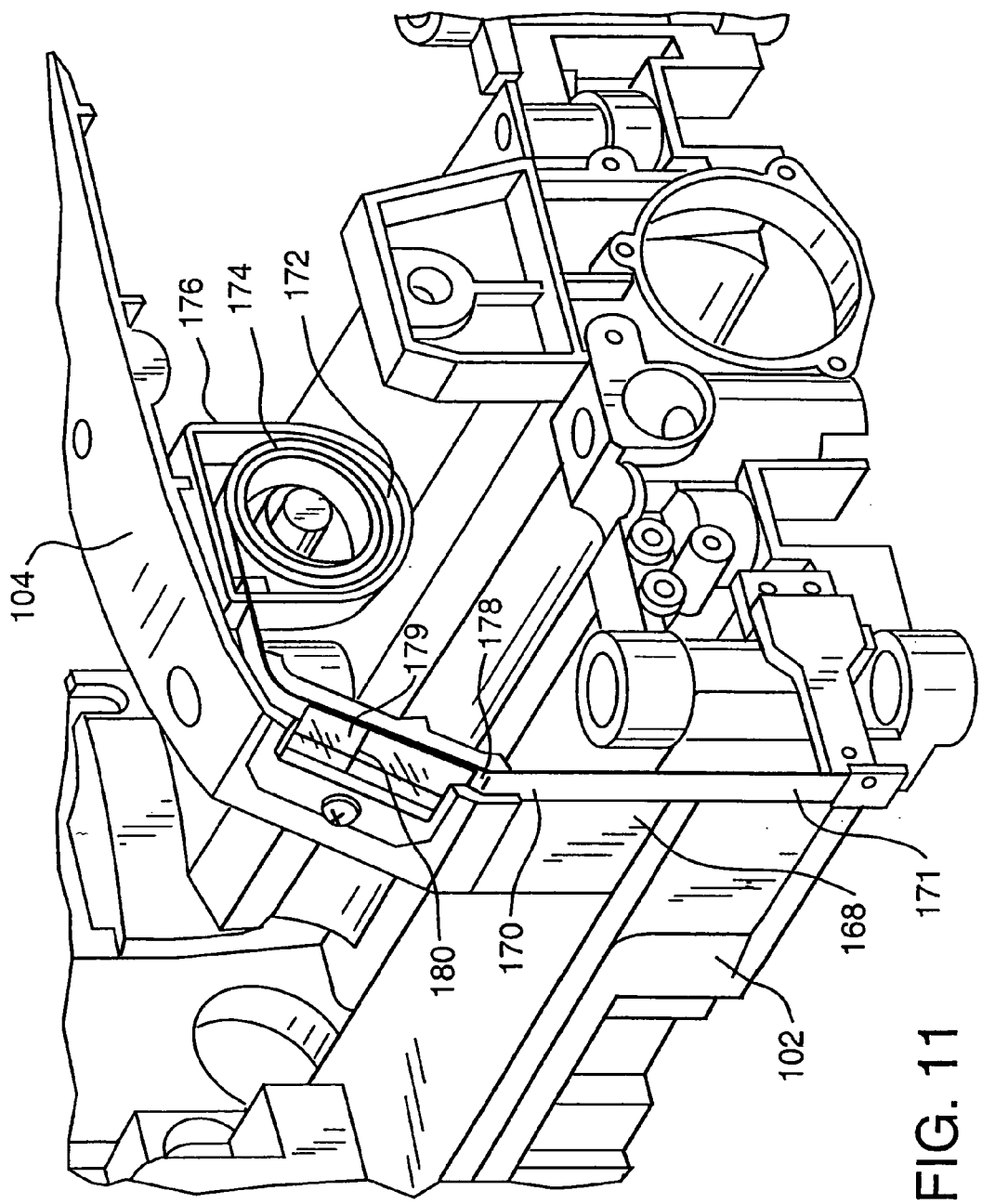
FIG. 11 is a partial isometric view of an embodiment of a depth-measuring device of the invention.

As can be seen in FIG. 11, another embodiment of the planer 100 may also include a depth measuring device 168 that displays the distance of the cutterhead 102 from the base 103 as the cutterhead 102 is adjusted in height. The depth measuring device 168 includes a commercially available retractable measuring device 170, such as a tape, of the type that retracts to wind up on a tape roll 174 inside a housing 176. The retractable tape 170 has a first end 171 and a second end 172. The first end 171 of the retractable tape 170 is attached to the cutterhead 102 by common mechanical fasteners, such as rivets or screws, and the second end 172 is attached to the tape roll 174. The housing 176 is attached to the top frame 104 of the planer. The retractable tape 170 has a portion with a scale 178 thereon. A viewing window 179 covers a portion of the scale 178 and is attached to the top frame 104 of the planer. The scale is calibrated to show the current height of the cutterhead 102 from the base 103 at a cursor line or other scale indicator 180 on the clear window 179. The depth measuring device 168 is an inexpensive and easy to install accessory for a planer 100 and may be advantageously used in conjunction with the depth stop mechanism 128 to measure at a glance the height of the cutterhead 102 from the base 103 for setting the desirable minimum thickness $t_{min}$ for planing a workpiece 114.

Another embodiment of the present invention may comprise a planer 100 that has a workpiece level indicator assembly 181 shown in FIGS. 12(a)–12(d). The workpiece level indicator assembly 181 includes a workpiece level indicator plate 182 that is mounted preferably on the front surface 184 of the cutterhead 102, such that it can slide between an engaged position shown in FIG. 12(a) and a disengaged position shown in FIG. 12(c). The mounting means may be, for example, two slots 194 each having a left indentation 195 and fasteners 196 sized to extend through the slots 194 to be threadedly received in corresponding threaded holes in the cutterhead. The workpiece level indicator plate 182 has a bottom face 186 parallel to the base 103 and a front ledge 188.

Figure 12A:
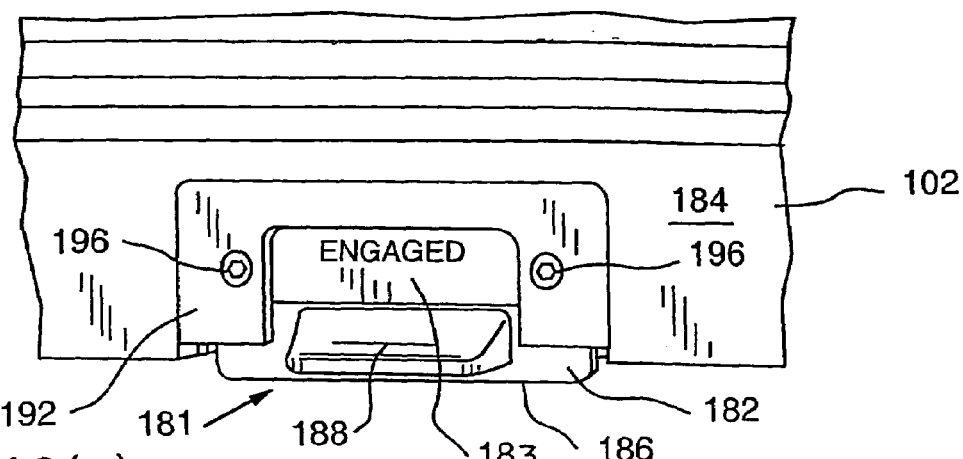
FIG. 12(a) is a partial isometric view of an embodiment of a workpiece level indicator assembly in the engaged position.
Figure 12B:
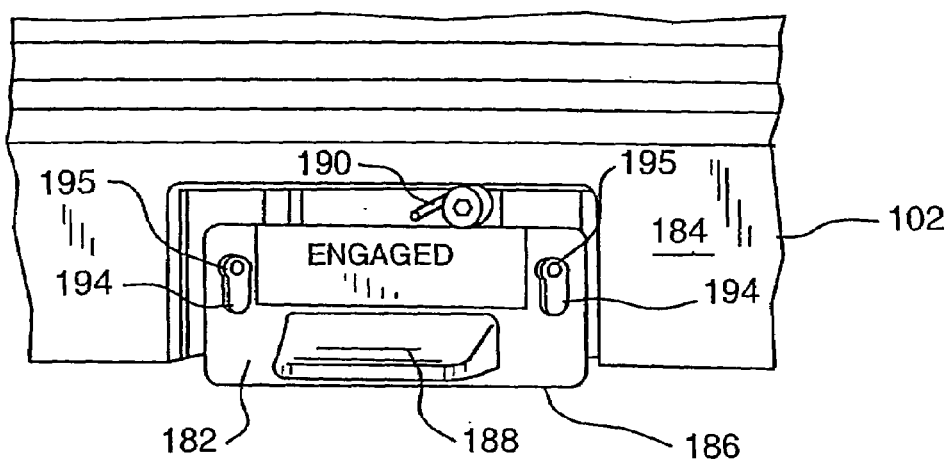
FIG. 12(b) is an isometric view of the workpiece level indicator of FIG. 12(a)
Figure 12C:
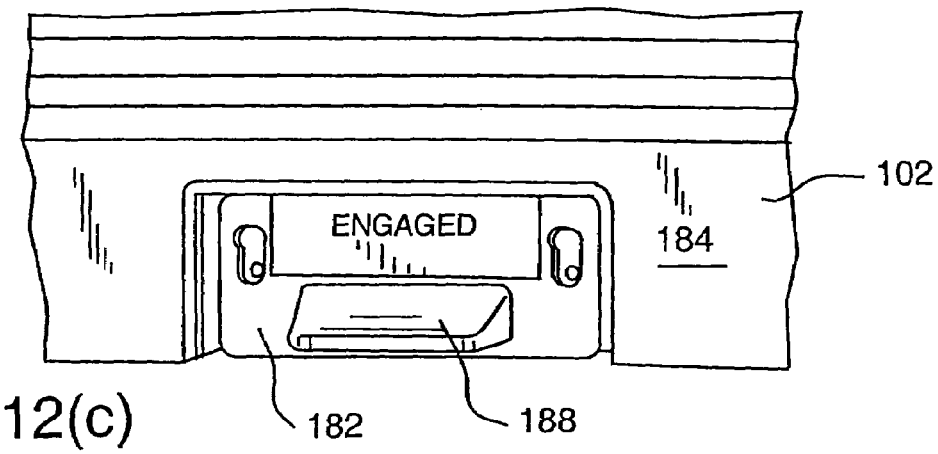
FIG. 12(c) is an isometric view of the workpiece level indicator of FIG. 12(b) in the disengaged position.
Figure 12D:
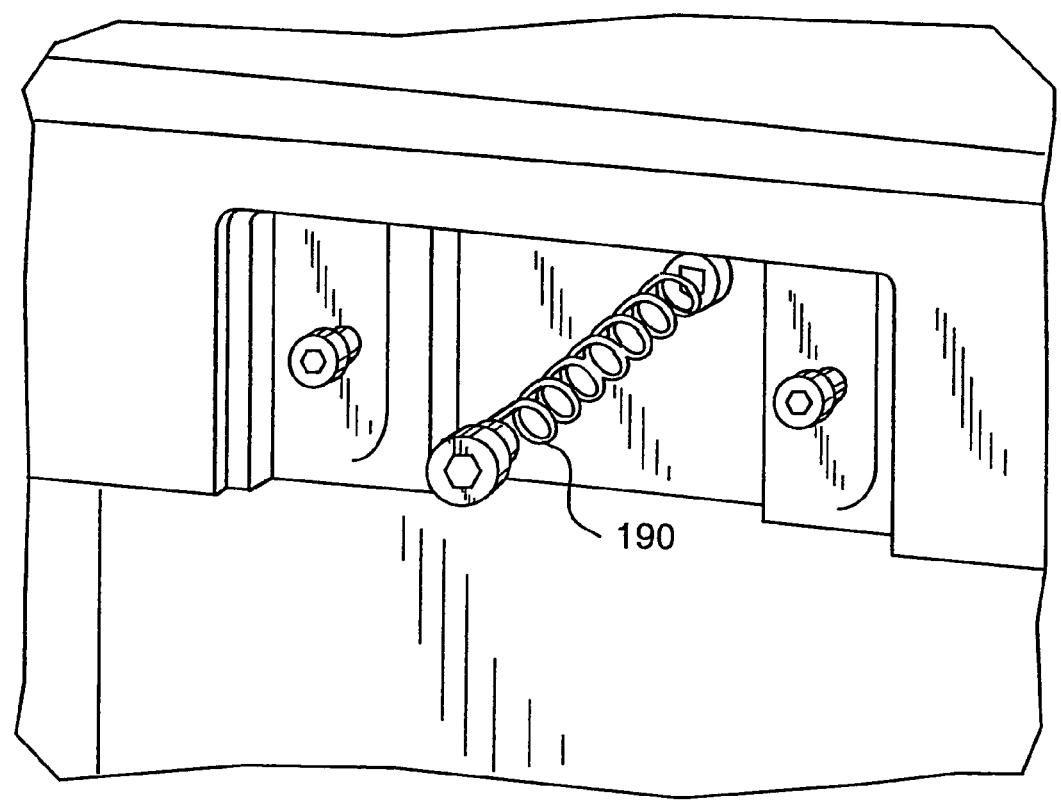
FIG. 12(d) is an isometric view a spring connected to the workpiece level indicator of FIG. 12(a)

A spring 190, illustrated in FIG. 12(d) mounted on the front side 184 of the cutterhead 103 biases the workpiece level indicator plate 182 to the right and such that the fasteners 196 are received in their respective indentation 195. This position is the engaged position. As can be seen in FIG. 12(b), when the level indicator plate 182 is in the engaged position, the bottom face 186 extends below the lower surface of the cutterhead 102. When the cutterhead 102 is lowered onto the workpiece, the bottom face 186 of the level indicator plate 182 contacts the workpiece causing the plate 182 to slide upward against the biasing force of the spring 190. A cover plate 192 may also be mounted on the front side 184 of the cutterhead 103 with fasteners 196 such that it may cover an inscription 183 the indicator in the disengaged position, such as the word "ENGAGED", and exposing the inscription 183 in the engaged position.

Figure 13A:
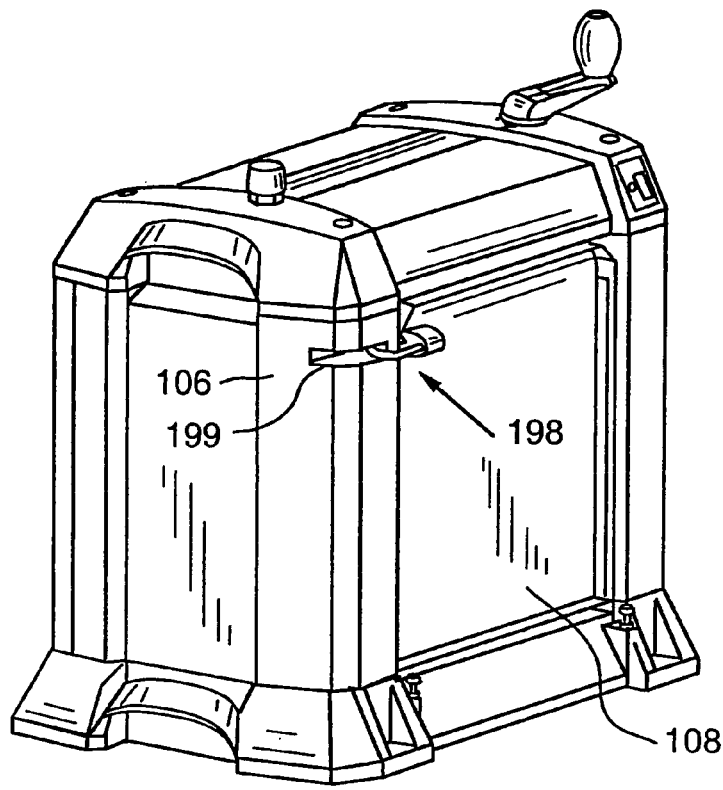
FIG. 13(a) is an isometric view of an embodiment of a locking device for a planer in the storage position.
Figure 13B:
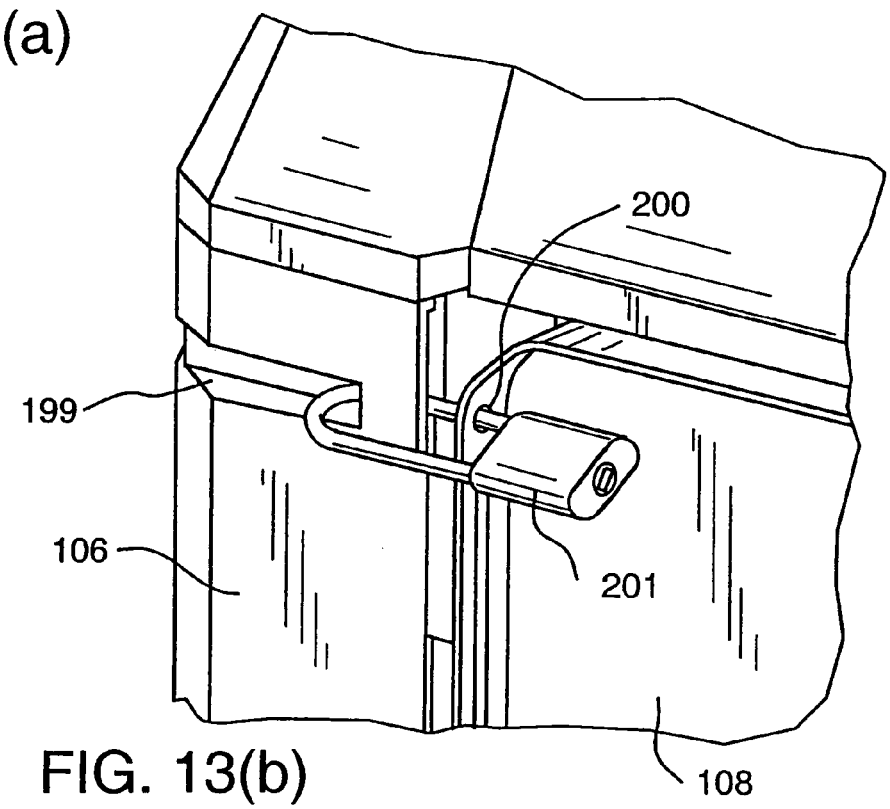
FIG. 13(b) is a magnified view of the locking device of FIG. 13(a)
Figure 14:
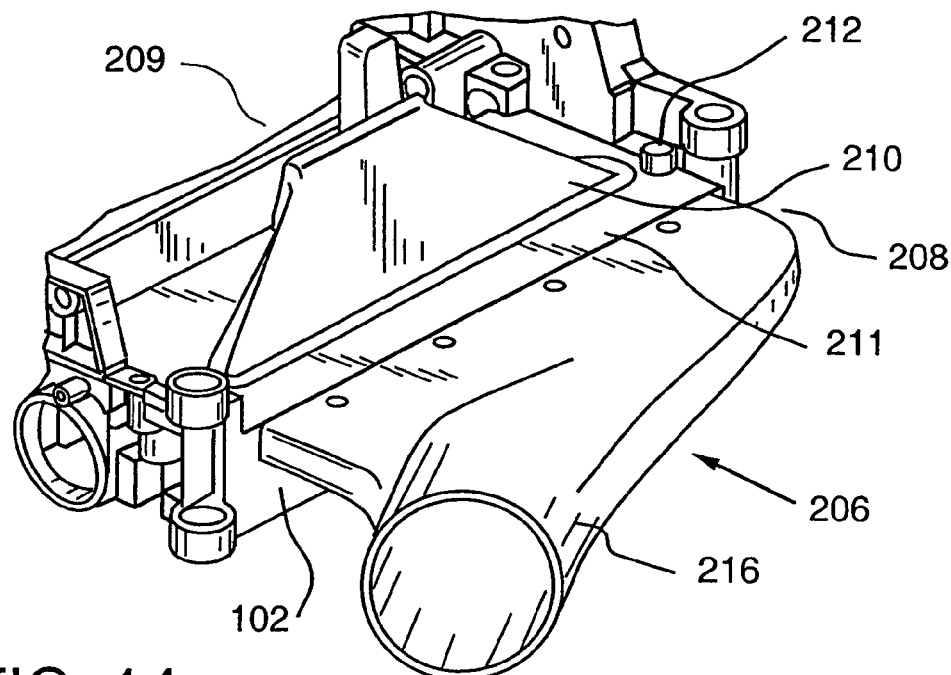
FIG. 14 is a partial isometric view of an embodiment of a dust removal assembly of the invention.
Figure 15:
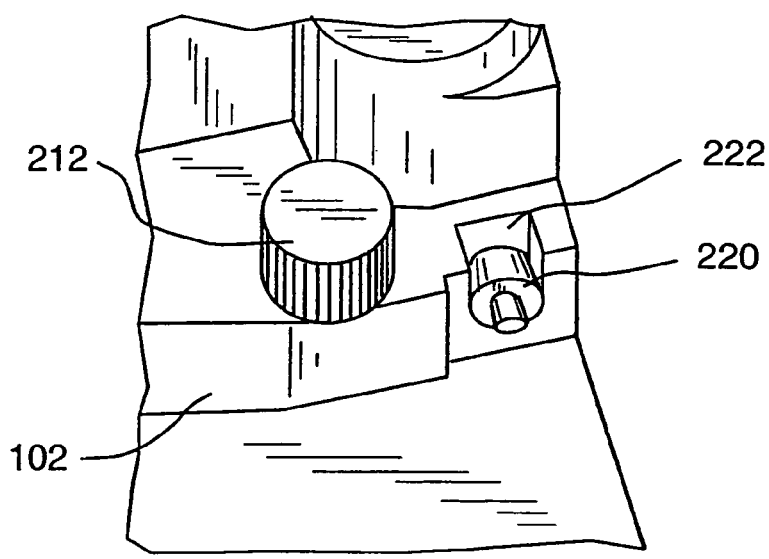
FIG. 15 is a detail of the dust removal assembly of FIG. 14 showing only the end posts of the dust channel in the guiding slots.
Figure 16:
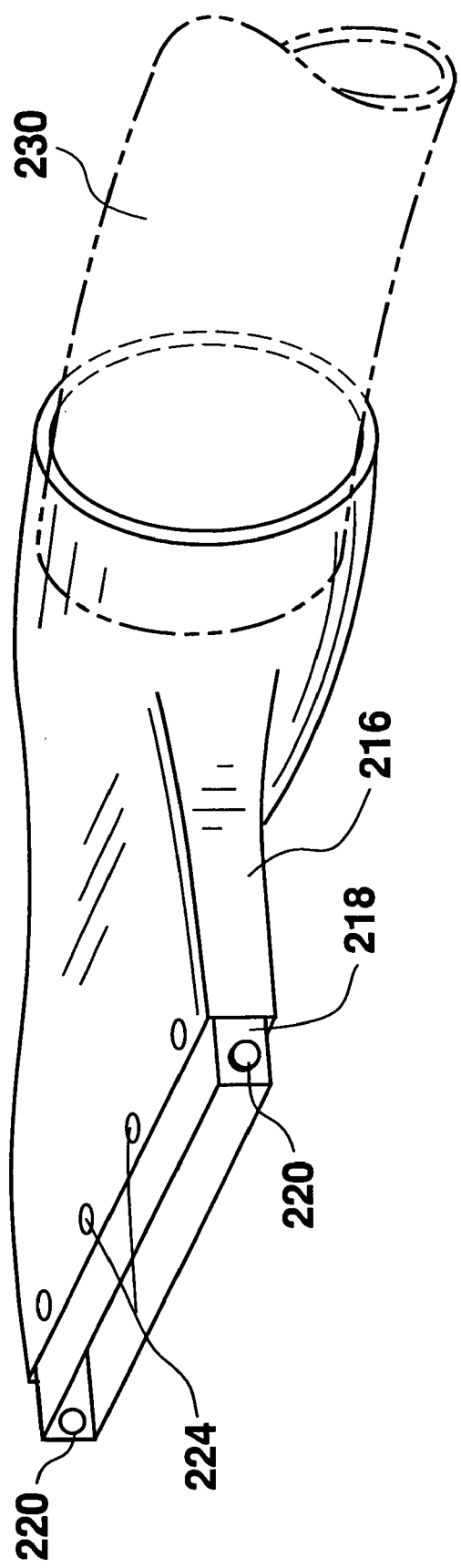
FIG. 16 is an isometric view of the dust chute and dust channel of FIG. 14.
Figure 17:
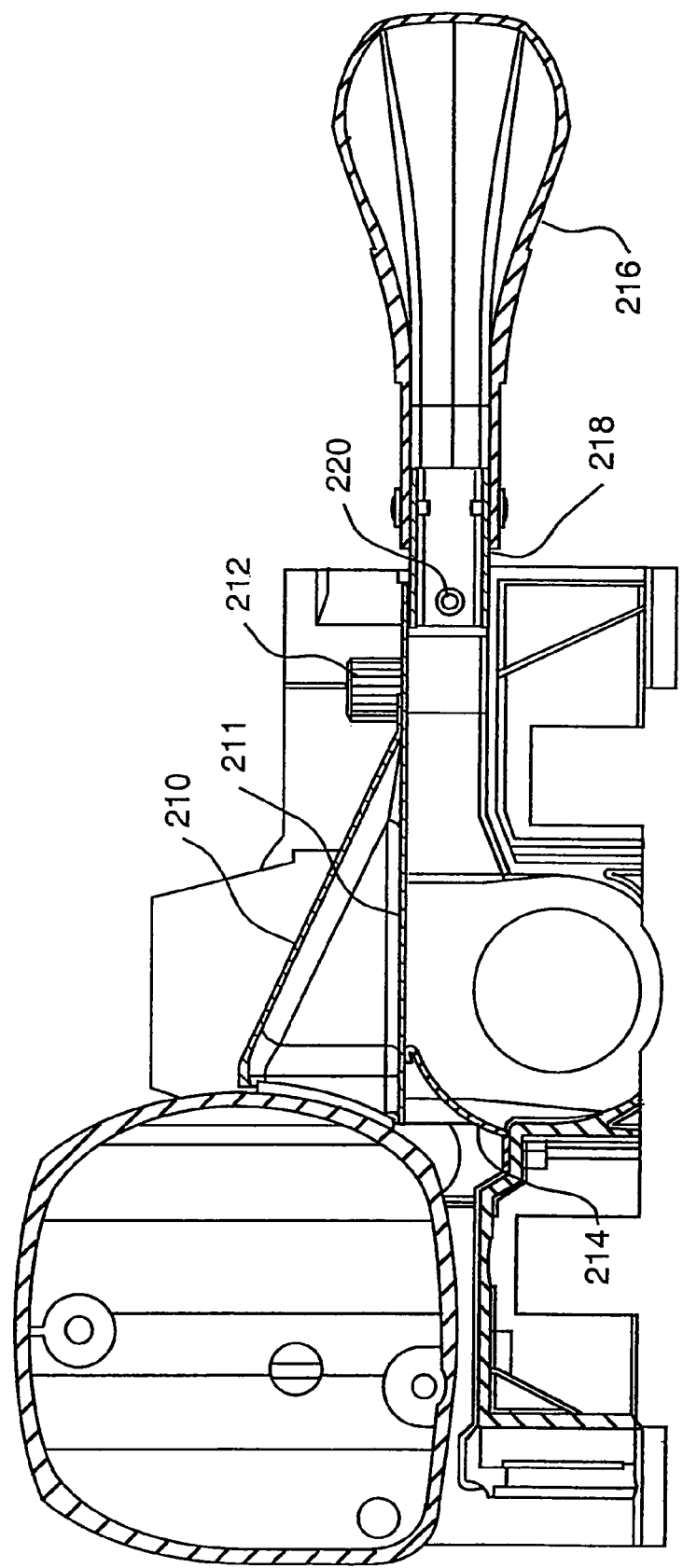
FIG. 17 is a sectional view of the dust removal assembly of FIG. 14 assembled on a carriage assembly of a planer.

Yet another embodiment of the planer 100 may include a locking mechanism 198, which allows the infeed table 108 to pivot between an extended position during operation and an upright storage position in which the planer 100 is switched off and the cutting blade is inaccessible for safety reasons, as shown in FIGS. 1, and 13(a) and (b). The locking mechanism 198 includes an aperture 199 on the side frame 106 of the planer 100 and an aperture 200 on the infeed table 108. The apertures 199 and 200 are aligned such that a locking device 201, such as, for example, an ordinary padlock or other safety lock, may be inserted through the aperture 199 of the side frame 106 and the aperture 200 of the infeed table 108 to secure and lock the infeed table 108 in the upright position. In the upright and locked position, the infeed table 108 pushes against and switches off the power switch 203 (shown in FIG. 1) of the planer 100.

The planer 100 may also include a dust removal assembly 206, as shown in FIGS. 14–17. The dust removal assembly 206 is positioned on the outfeed side 208 of the carriage assembly 102 and includes a manifold 210 having a manifold deck 211. The manifold 210 is removably attached to the carriage assembly 102 by means of, for example, a pair of thumb screws 212 (only one is shown) through the manifold deck 211. The dust removal assembly 206 also includes a dust deflector 214, which is attached to the carriage assembly 102 with any suitable fasteners toward the infeed side 209 and deflects airflow and dust or shavings under the manifold deck 211.

The dust removal assembly 206 also includes a dust chute 216 that communicates with the manifold 210 through a dust channel 218, which is releasably connected to the carriage assembly 102. The dust channel 218 may be attached to the dust chute 216 with fasteners 224, or by welding, and may be an integral part of the dust chute 216. The dust channel 218 has two end posts 220, which are attached, for example, by spot welds, and are sized to slide into corresponding guiding slots 222 on the carriage assembly 102. The guiding slots 222 help slide the dust channel 218 and dust chute 216 easily onto the carriage assembly 102. The manifold 210 is then placed on the carriage assembly 102 and the thumbscrews 212 are inserted and tightened over the manifold deck 211. The dust chute 216 has a side opening 226, to which a vacuum hose (such as, for example, vacuum hose 230 shown in outline in FIG. 17) may be attached for dust removal. The side opening 226 directs dust to one side of the planer 100. The portion of the dust channel 218 that connects to the carriage assembly is symmetrically shaped. Thus, the dust channel 218 may be connected to the carriage assembly 102 in either a first position, with the side opening 226 directed to a right side of the planer 100, or a second position, with the side opening 226 directed to a left side of the planer 100.

The depth stop mechanism 128, the depth measuring device 168, the workpiece level indicator assembly 181, the locking mechanism 198 and the dust removal assembly 206 have all been described for a portable planer, but they can readily be used with a standard planer or other machine that includes a rotary cutting member 105 mounted on a carriage assembly 102, such as a combination planer/molder, planer/sander, etc.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A dust removal assembly for a machine that includes a carriage assembly that has an infeed side, an outfeed side and a rotary cutting member, the dust removal assembly comprising:
   a manifold removably attachable to the carriage assembly over the cutting member on the outfeed side of the carriage assembly;
   a dust deflector directing airflow to the manifold; and
   a dust chute communicating with the manifold, the dust chute having a channel releasably connected to the carriage assembly and a side opening for connection to a vacuum hose.

2. The dust removal assembly of claim 1, wherein the channel includes two end posts which are slidably received in corresponding slots of the carriage assembly.

3. A planer comprising:
   a carriage assembly including an infeed side, an outfeed side and a pair of guiding slots;
   a rotary cutting member within the carriage assembly; and
   a dust removal assembly comprising:
      a manifold removably attachable to the carriage assembly over the cutting member on the outfeed side of the carriage assembly;
      a dust deflector directing airflow to the manifold; and
      a dust chute communicating with the manifold, the dust chute having a side opening for connection to a vacuum hose and a channel releasably connected to the carriage assembly with a pair of posts correspondingly slidable in the pair of guiding slots.

4. The planer of claim 3 wherein the channel is symmetrically shaped such that the dust chute is selectively attachable to the carriage assembly in at least two positions.

5. The planer of claim 4 wherein when the dust chute is in one of the at least two positions the side opening is directed to a right side of the planer.

6. A dust removal assembly for a machine that includes a carriage assembly that includes a workpiece infeed side, a workpiece outfeed side, and a rotary cutting member, the dust removal assembly comprising:
   a manifold removably attachable to the carriage assembly over the cutting member on the outfeed side of the carriage assembly; and
   a dust chute communicating with the manifold, the dust chute including an opening for connection to a dust collection device, and a channel that is releasably and selectively connected to the carriage assembly in at least two positions.

7. The planer of claim 6 wherein the opening of the dust chute is a side opening, and further wherein in a first of the at least two positions the side opening opens to a right side of the planer, and in a second of the at least two positions the side opening opens to a left side of the planer.

8. The planer of claim 6 wherein the channel is symmetrically shaped.

9. The planer of claim 6 wherein an outer surface of the channel includes at least two posts, the carriage assembly includes at least two guide tracks, and wherein each post is slidingly received in a corresponding guide track when connecting the dust chute to the carriage assembly.

10. A dust removal assembly for a machine that includes a carriage assembly that includes a workpiece infeed side, a workpiece outfeed side, and a rotary cutting member, the dust removal assembly comprising:
   a manifold removably attachable to the carriage assembly over the cutting member on the outfeed side of the carriage assembly;
   a dust chute communicating with the manifold, the dust chute including a side opening for connection to a vacuum hose; and
   means for releasably and selectively connecting the dust chute to the carriage assembly in one of at least two positions.

11. A planer comprising:
   a carriage assembly including a workpiece infeed side, a workpiece outfeed side, and a pair of guiding slots;
   a rotary cutting member within the carriage assembly; and
   a dust removal assembly comprising:
      a manifold removably attachable to the carriage assembly over the cutting member on the outfeed side of the carriage assembly; and
      means for releasably and selectively connecting the dust chute to the carriage assembly in one of at least two positions.

* * * * *

UNITED STATES PATENT AND TRADEMARK OFFICE
CERTIFICATE OF CORRECTION

| | | |
|---|---|---|
| PATENT NO. | : 7,055,561 B2 | Page 1 of 1 |
| APPLICATION NO. | : 11/148992 | |
| DATED | : June 6, 2006 | |
| INVENTOR(S) | : Garcia et al. | |

It is certified that error appears in the above-identified patent and that said Letters Patent is hereby corrected as shown below:

Col. 1, Line 6, delete "6,951,231" and insert --6,951,231.--.

Col. 1, Line 37, delete "Also" and insert --Also,--.

Col. 1, Line 58, delete "planer" and insert --planer,--.

Col. 1, Line 59, delete "a first" and insert --first--.

Col. 2, Line 65, delete "also" and insert --also a--.

Col. 3, Line 1, delete "which that" and insert --which--.

Col. 3, Line 17, insert "a" before the word --planer--.

Col. 3, Line 52, insert "of" before the phrase --a spring--.

Col. 4, Line 58, delete "inches" and insert --inch--.

Col. 5, Line 6, delete "includes as sleeve" and insert --includes a sleeve--.

Col. 8, Line 38, insert "on" before the phrase --the indicator--.

Signed and Sealed this

Eighteenth Day of December, 2007

JON W. DUDAS
*Director of the United States Patent and Trademark Office*